(12) United States Patent
Frecska et al.

(10) Patent No.: US 6,467,381 B1
(45) Date of Patent: Oct. 22, 2002

(54) ADJUSTABLE TOOL HOLDER APPARATUS

(76) Inventors: Laszlo Frecska, 21621 Cedar St., Lake Villa, IL (US) 60046; James T. Hartford, 534 N. Fifth St., Silver Lake, WI (US) 53170

( * ) Notice: Subject to any disclaimer, the term of this patent is extended or adjusted under 35 U.S.C. 154(b) by 37 days.

(21) Appl. No.: 09/610,210

(22) Filed: Jul. 5, 2000

Related U.S. Application Data
(60) Provisional application No. 60/154,807, filed on Sep. 20, 1999.

(51) Int. Cl.[7] ................................................ B23B 31/00
(52) U.S. Cl. ........................... 82/158; 82/159; 82/160; 409/232
(58) Field of Search .......................... 82/158, 159, 160, 82/161, 142, 147; 407/33, 32, 30; 409/230, 231, 232, 234; 408/226

(56) References Cited

U.S. PATENT DOCUMENTS

| | | | | |
|---|---|---|---|---|
| 3,649,129 A | * | 3/1972 | King, Jr. | 408/139 |
| 3,658,435 A | * | 4/1972 | Kubicek | 408/239 |
| 3,680,436 A | * | 8/1972 | Marsland | 409/232 |
| 3,699,843 A | * | 10/1972 | Sweeny | 407/9 |
| 3,734,517 A | * | 5/1973 | Benjamin | 279/81 |
| 4,519,734 A | * | 5/1985 | Mitchell et al. | 409/231 |
| 4,642,005 A | | 2/1987 | Rondo et al. | |
| 4,714,389 A | | 12/1987 | Johne | |
| 4,726,721 A | | 2/1988 | Heel et al. | |
| 5,167,478 A | * | 12/1992 | Ramunas | 409/234 |
| 5,352,073 A | | 10/1994 | Roiche | |
| 5,407,308 A | | 4/1995 | Kitamora | |
| 5,746,298 A | * | 5/1998 | Krivec et al. | 192/48.3 |
| 5,771,762 A | * | 6/1998 | Bissett | 82/1.11 |

* cited by examiner

Primary Examiner—Henry Tsai
(74) Attorney, Agent, or Firm—Leo J. Aubel

(57) ABSTRACT

A tool holder apparatus mountable on a machine spindle which apparatus is adjustable and provides a solid stable support for the tool holder to eliminate any gap or spacing between the end of a machine spindle and the support collar of the tool holder.

3 Claims, 1 Drawing Sheet

FIG. 1
FIG. 2
FIG. 3
PRIOR ART
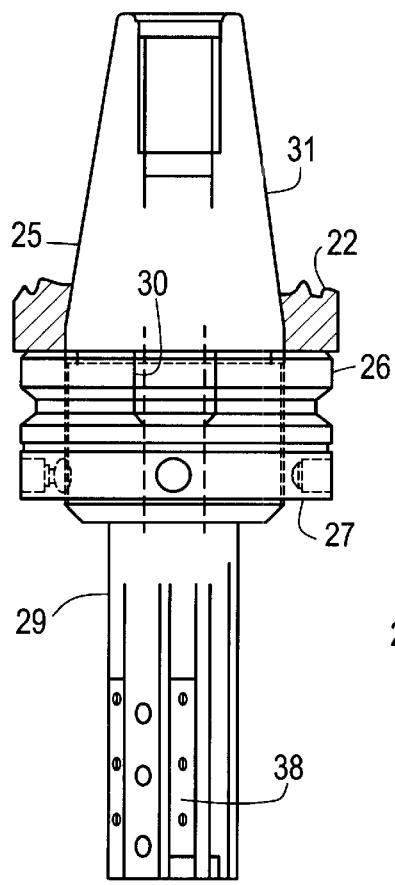
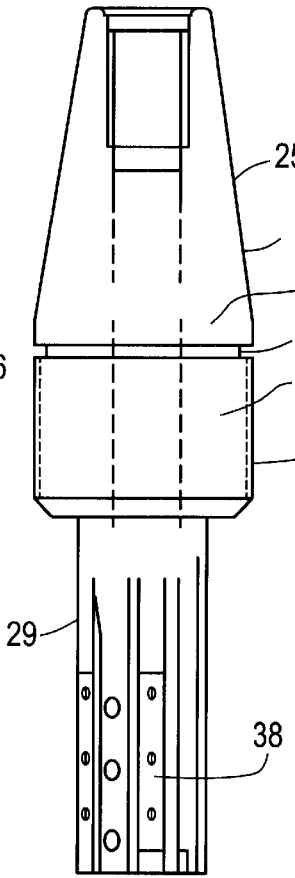
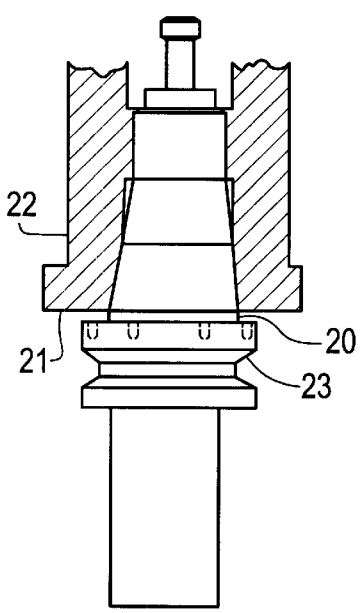
FIG. 4
FIG. 6
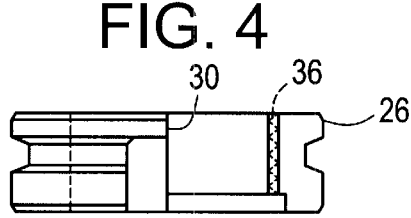
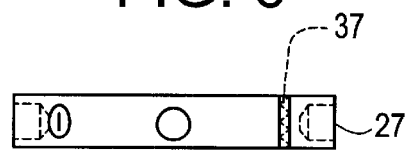
FIG. 5
FIG. 7
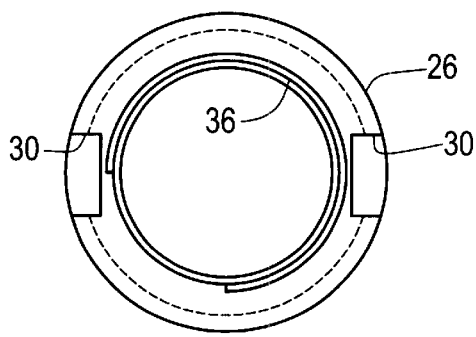
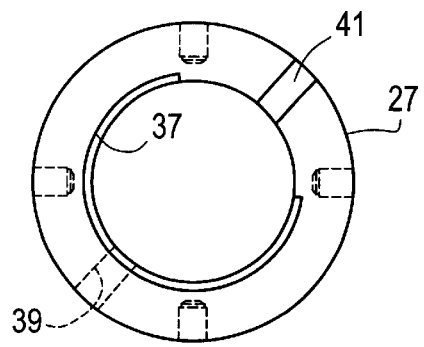

ADJUSTABLE TOOL HOLDER APPARATUS

This application claims the priority filing date of provisional patent application Ser. No. 60/154,807 filed on Sept. 20, 1999.

BACKGROUND OF INVENTION

A prior art coupling apparatus for attaching a tool holder to a machine spindle of a type widely used in the industry is depicted in FIG. 3. As can be clearly seen from FIG. 3, there is a gap or spacing 20 of about ⅛ to ¼ inch between the free end 21 of machine spindle 22 and the integral collar 23 formed on the shank of the tool holder 24. It has been found that this gap or spacing 20 is an area of weakened structural support, particularly when operating the machine at high speeds and when milling or grinding the harder materials. This contributes to misalignment of the tool, tending to provide rough and/or inaccurate work and to cause bending and wearing of the associated tool. Tool holders mounted on a machine spindle and forming a gap between the tool holder collar and the spindle are shown in U.S. Pat. No. 5,407,308. Also, U.S. Pat. Nos. 4,714,389 and 5,352,073 show tool holder apparatus including a means for affixing the tool holder to the spindle for eliminating the gap or spacing; however the tool holder shown in the latter two patents is complex, and the support collar shown therein is integral to the shank, and is not adjustable. As seen from FIG. 1, the present invention discloses tool holder apparatus having an adjustable support collar on the tool holder for eliminating the gap or spacing between the support collar and the end of the spindle thereby enabling the apparatus to be universally employed with varing types and sizes of spindles and tool holders; further the inventive apparatus can be retrofitted to existing equipment.

SUMMARY OF THE INVENTION

It is a primary purpose and feature of the present invention to provide a tool holder apparatus which is readily adjustable to provide a solid, stable support for an associated tool, and which adjustable tool holder apparatus eliminates the gap or spacing between the end of a machine spindle, and the support collar on the shank of the tool holder.

The foregoing features and advantages of the present invention will be apparent from the following more particular description of the invention. The accompanying drawings, listed herein below, are useful in explaining the invention.

DESCRIPTION OF DRAWINGS:

FIG. 1 shows the inventive tool holder apparatus including the adjustable support collar and the locking collar;

FIG. 2 shows the body of the inventive tool holder apparatus without the adjustable support collar and without the locking collar to better show the threaded cylindrical portion of the shank;

FIG. 3 shows a prior art tool holder that clearly shows the gap 20 which the present invention eliminates;

FIG. 4 shows and side view, partially in section, of the support collar;

FIG. 5 shows a front view of the support collar;

FIG.6 shows a side view of the locking collar; and

FIG. 7 shows a front view of the locking collar;

DESCRIPTION OF THE INVENTION:

As stated above, FIG. 3 shows a prior art type of tool holder wherein there is a gap or space 20 between the free end 21 of the machine spindle 22 and the support collar of the tool holder 24. The disadvantages of the prior art apparatus have been discussed above.

FIG. 1 is a side view of a preferred embodiment of the inventive tool holder 25 apparatus including an adjustable flange or support collar 26 and a locking collar 27. As is known, material cutting members such as thread milling inserts generally labeled as 38, are mounted at the free end 29 of the tool holder 25. The mounting end 31 (the tapered upper end as oriented in FIG. 1) of tool holder apparatus 25 is mounted in the machine spindle 22, as is known.

Refer now to FIG. 2, which shows the body 33 of the tool holder apparatus 25 without the adjustable support collar 26 or the locking collar 27. In a preferred embodiment, the body 33 of the tool holder apparatus 25 includes the free end portion 29 for receiving the cutting inserts, a cylindrical portion 32, and a tapered portion or cone 31 that is inserted and affixed in the machine spindle, as is known.

The cylindrical portion 32 has external threads 34 to receive adjustable support collar 26 and the locking collar 27, each of which collars has internal threads that screw onto threads 34, as further explained below. A peripheral recess 35 is formed between the tapered portion 31 and cylindrical portion 32 of tool holder 25 to provide a chase or reduced section at the end of threads 34.

As shown in FIG. 1, the tapered portion 31 of tool holder 25 is affixed to the spindle 22, as is known. The support collar 26, also shown in FIGS. 4 and 5, includes internal mating threads 36 which mate with threads 34 of cylindrical portion 32. The adjustable support collar 26 is threaded on the threads 34, until the collar 26 firmly abuts the spindle 22. The support collar 26 which is screwed onto, or turned on, the threaded cylindrical portion 32 can thus accommodate various lengths of the tool holder 25 and of the machine spindle 22. Support collar 26 includes known drive keys (recesses) 30.

As shown in FIGS. 6 and 7, the locking collar 27 includes mating internal threads 37 which mate with, and are threaded on, the threads 34 of cylindrical portion 32. After the support collar 26 is threaded on threads 34 and adjusted to be in a position abutting the end of the machine spindle 22, the locking collar 27 is screwed on threads 34 to be positioned to abut against adjustable collar 26 and secure collar 26 in position, as indicated in FIG. 1. Locking collar 27 has apertures 39 for receiving set screws or pins 41 to affix locking collar 27 in position. Thus, adjustable support collar 26 is movable to abut against the spindle 22, and locking collar 27, in turn, is movable to abut and secure adjustable collar 26 in position abutting the end of the spindle.

Thus as is clearly seen from FIGS. 1 and 2, the support collar 26 of the inventive tool holder apparatus 25 is adjustable and positionable to abut against the end of the spindle 22, to provide a firm support shoulder and bracing area along the circumference of the tool holder, and to eliminate any undesired gap between the end of the spindle and the tool holder collar. The difference and improvement over the prior art is seen from a comparison of FIG. 1 against FIG. 3.

The tool holder apparatus 25 is universally useful, it is adaptable for varying types of spindles, it can be used on new spindles and may be retrofitted to existing machines.

While the invention has been particularly shown and described with reference to a particular embodiment thereof it will be understood by those skilled in the art that various changes in form and detail may be made therein without departing from the spirit and scope of the invention.

What is claimed is:

1. A tool holder for holding rotary cutting tools, said tool holder being attachable to a machine spindle having an opening with a smooth cone-like surface tapered inwardly from a wide opening at its free end, said tool holder comprising:
   a) an elongated holder body for securing to said spindle for rotation therewith;
   b) said holder body having a cone-like tapered section for sliding longitudinal insertion of the narrow end of said section into said opening at the free end of said spindle for attaching said tool holder to said spindle and enabling said tapered section to be pulled into said tapered opening until said tapered section abuts the surface of said tapered opening, thereby not requiring a precise fit of said tapered section and said tapered opening;
   c) said holder body having a cylindrical section extending from extending from the wider end of said cone- like tapered section;
   d) said cylindrical section having threads on its periphery; and
   e) a support collar adjustably threadable onto said periphery and into abutting contact with said free end of said spindle.

2. A tool holder as in claim 1 wherein said adjustable collar when positioned to be in tight abutting relation with the free end of said spindle eliminates any spacing between the free end of the spindle and the adjustable collar to provide additional support surface for said tool against said spindle.

3. A tool holder as in claim 1 further including a locking collar threadable on said threads and positionable to abut against said support collar to lock said support collar in position.

* * * * *